L. HARRIS.
TIRE.
APPLICATION FILED APR. 3, 1916.
1,258,564.
Patented Mar. 5, 1918.
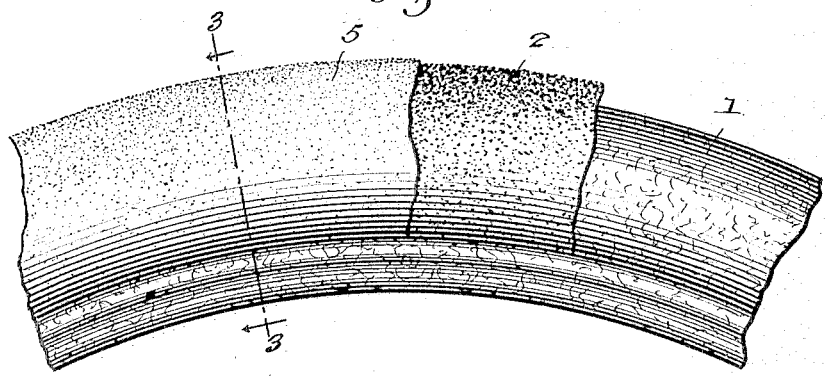
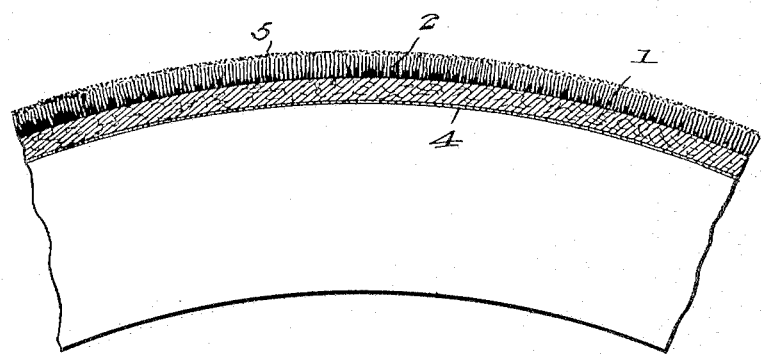
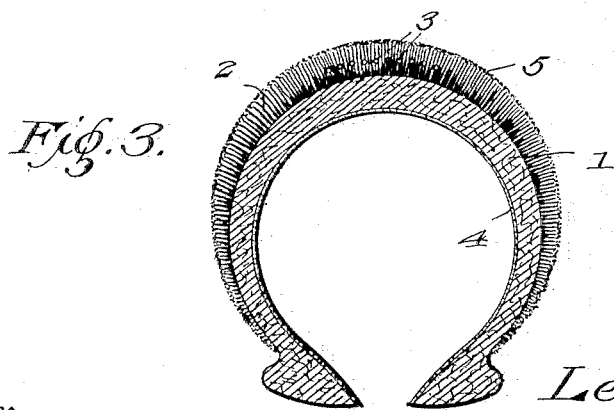
Inventor
Lewis Harris,
By Victor J. Evans
Attorney
Witnesses
Hugh H. Ott

UNITED STATES PATENT OFFICE.

LEWIS HARRIS, OF BENTON, ILLINOIS.

TIRE.

1,258,564.　　　　　Specification of Letters Patent.　　Patented Mar. 5, 1918.

Application filed April 3, 1916. Serial No. 88,604.

*To all whom it may concern:*

Be it known that I, LEWIS HARRIS, a citizen of the United States, residing at Benton, in the county of Franklin and State of Illinois, have invented new and useful Improvements in Tires, of which the following is a specification.

This invention relates to a tire of the pneumatic type adapted primarily for use upon automobiles, bicycles, and the like, although the improved construction of the tire enables the same to be advantageously used upon other vehicles if found desirable.

The primary object of the invention is to provide a tire of the class described which is substantially puncture proof and which may be constructed from textile material thereby decreasing the cost of manufacture of the tire to a considerable extent.

Another object of the invention is to provide a tire having a fabric body exteriorly of which is arranged a fibrous facing having its tread surface formed by a mineral filling and with the fibers of the facing bound to each other and to the body of the tire with a water-proof binding, in such a manner as to increase the wearing qualities of the tire.

A still further object of the invention is to provide a tire with a facing formed from fibrous material, with the fibers so arranged with relation to the tire body, that when said facing is impregnated with a bituminous binding, the fibers forming the facing will be secured to the tire body in end-wise relation thus greatly increasing the wearing qualities of the facing and also enabling the tire to be sufficiently compressible to absorb shocks and jars, incident to the travel of the vehicle to the wheel of which, the tire is applied.

With these and other objects in view the invention resides in the novel combination and arrangement of parts which will be hereinafter described and particularly pointed out in the claims.

The preferred embodiment of the invention has been illustrated in the accompanying drawing although no restriction is necessarily made to the precise details of construction therein shown as changes, alterations and modifications within the scope of the claims may be resorted to when desired.

Like characters of reference denote corresponding parts throughout the several views in the drawing in which:

Figure 1 is a side elevation of a portion of a tire constructed in accordance with the invention and having a portion of the facing thereon broken away.

Fig. 2 is a longitudinal sectional view through a portion of the improved tire.

Fig. 3 is an enlarged transverse sectional view on the line 3—3 of Fig. 1.

Referring now to the drawing in detail, the numeral 1 designates the body of the improved tire which is formed from closely woven fabric, such as cotton, or the like, said fabric being knitted in bands, having beaded marginal edges, by a machine designed for this purpose, so that the tire body may be shaped by another machine to correspond substantially in shape to tires now in common use.

The body 1 is provided on its exterior surface with a circumferentially arranged facing 2 which, is substantially crescent shape in cross section and formed from fibrous material, such as cotton, or the like, with the fibers of the material arranged in endwise relation to the outer peripheral surface of the body 1, said fibrous material being impregnated with a bituminous binding, such as pine-tar which not only renders the facing impervious to moisture but binds the fibers to each other and to the body 1.

A tying element 3 is wound circumferentially about the facing 2 with the windings of the tying element embedded in said facing in spaced relation and below the tread portion of the body, said flexible tying element reinforcing the facing and assisting in securing the same to the body.

It will, of course, be understood that by impregnating the fibers of the facing with the bituminous binding and arranging the fibers in end-wise relation to the body, the wearing qualities of the facing are greatly increased.

The inner peripheral surface of the body 1, is treated with a stiffening agent, designated in the drawing by the numeral 4, and which may consist of shellac or a similar substance which is capable of hardening quickly when applied to said surface of the body.

The outer surface of the facing 2 of the tire is filled with a mineral filling 5 preferably powdered soap stone which forms the tread surface of the tire, said filling being rolled into the facing by a machine for this purpose not shown in the drawing, while the facing is in a plastic condition.

The filling 5 not only increases the wearing properties of the facing but prevents sand, and the like, from adhering thereto should the tire become heated through fast driving.

From the above description, taken in connection with the accompanying drawing, it is at once apparent that a tire of the class described has been provided which is simple in construction, durable in use, and inexpensive of manufacture.

Having thus described the invention, what is claimed as new, is:

1. A tire having a fibrous facing, a bituminous binder connecting the fibers of the facing with each other and with the tire, and a soap stone filling providing a tread surface upon said casing.

2. A tire comprising a body of absorbent material, a fibrous facing exteriorly of said body, a tar binder connecting the fibers of the facing with each other and with the body, a tying member retained in said facing by said binder, and a soap stone filling on the outer face of the facing.

3. A tire comprising a fabric body, a stiffening agent on the inner face of said body, a fibrous facing on the outer face of said body, tar connecting the fibers of the facing with each other and to the fabric body, and a soap stone filling on said facing.

In testimony whereof I affix my signature.

LEWIS HARRIS.